United States Patent Office 3,169,107
Patented Feb. 9, 1965

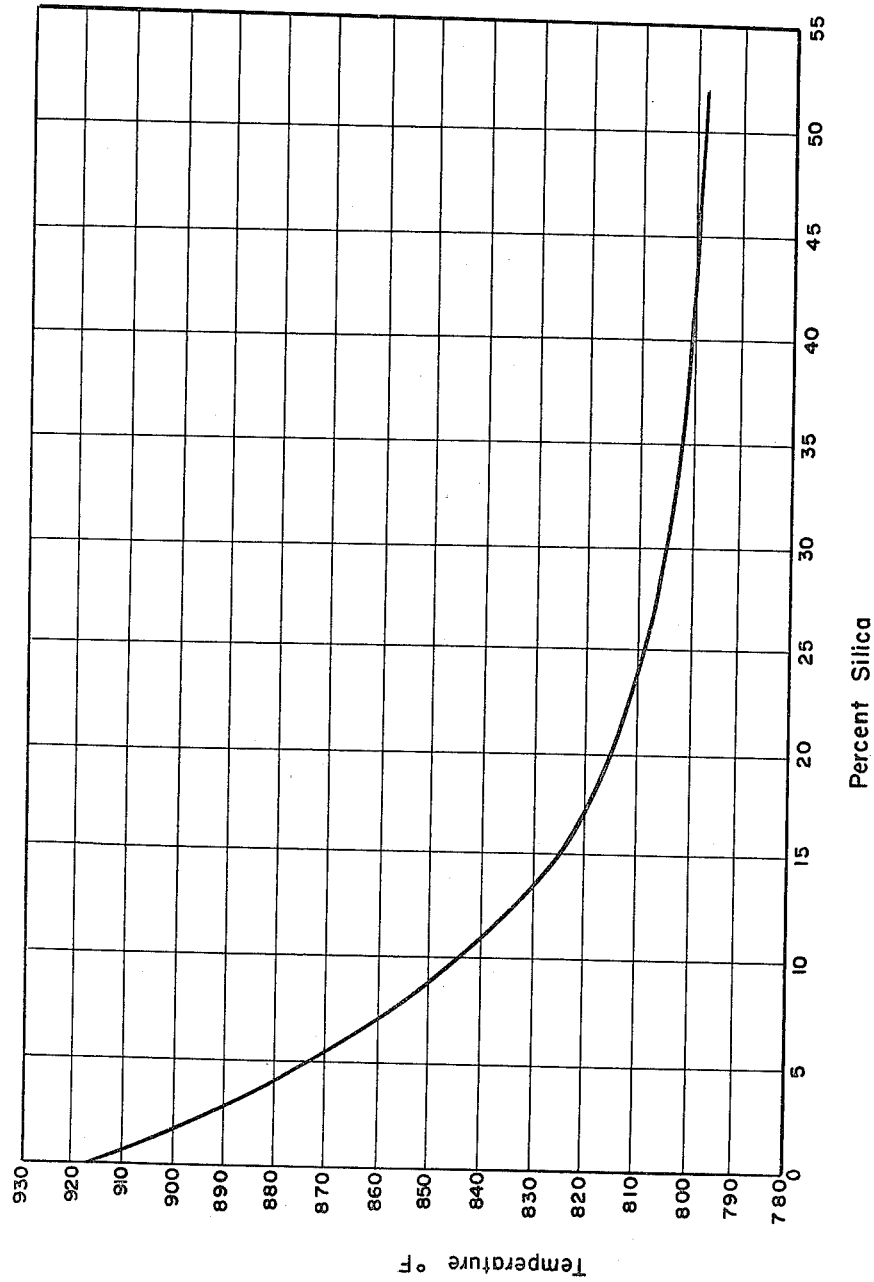

3,169,107
CATALYTIC HYDROCRACKING PROCESS WITH THE USE OF A CATALYST COMPOSITE COMPRISING PLATINUM OR PALLADIUM ON SILICA-ALUMINA
Harry L. Coonradt, Woodbury, and William E. Garwood, Haddonfield, N.J., assignors to Socony Mobil Oil Company, Inc., a corporation of New York
Filed May 13, 1960, Ser. No. 28,984
5 Claims. (Cl. 208—111)

This invention relates to an improved catalytic hydrocracking process. More particularly, the present invention is directed to a process wherein a high boiling petroleum hydrocarbon or hydrocarbon mixture is subjected to cracking in the presence of hydrogen and a solid porous catalyst composed of a metal of the platinum series deposited on a metal oxide and stabilized by intimate admixture thereof with silica in the form of a hydrogel or gelatinous precipitate in an amount corresponding to at least about 25 weight percent of the resulting dry composite. In another embodiment, the present invention is concerned with hydrocracking selected pertroleum stocks in the presence of a catalyst consisting essentially of a composite of 25 to 75 percent by weight silica, 0.05 to 10 percent by weight of a metal selected from the group consisting of platinum and palladium and remainder alumina prepared by impregnating the alumina component with the metal selected from the aforementioned group, mechanically mixing the resulting impregnated product with the silica component under conditions of intimate contact such as to effect chemical interaction between the same and drying and treating the resulting composite at an elevated temperature. The invention is further directed to the aforesaid catalyst.

As is well known, cracking refers generally to operations wherein a long-chain hydrocarbon or a mixture of high molecular weight hydrocarbons is converted into a shorter chain hydrocarbon or into a mixture of lower molecular weight hydrocarbons. Cracking accomplished solely as a result of the high operational temperature employed is known as thermal cracking while cracking effected in the presence of catalysts is ordinarily known as catalytic cracking. Cracking carried out in the presence of hydrogen is referred to as hydrocracking.

Catalytic cracking of petroleum hydrocarbons has heretofore been carried out at temperatures in the range of 800° to 1100° F. Such high temperatures have been inefficient from an economic standpoint and undesirable from an operational standpoint resulting in the production of unwanted coke, relatively large amounts of dry gas and excess quantites of $C_4$ hydrocarbons. The production of coke and dry gas represents a loss thereby bringing about an overall decrease in the yield of useful cracked product.

As is well known, charge stocks heretofore employed in catalytic cracking operations have been selected petroleum stocks. Thus, heavy residual stocks as well as cycle stocks obtained from the catalytic cracking of non-refractory petroleum cracking stocks have not generally been suitable for catalytic cracking processes because of their inherent coke forming characteristics and the excessive amounts of dry gas produced. Accordingly, the supply of available cracking stocks has been somewhat restricted.

Hydrocracking has been carried out in the presence of hydrogen at relatively high temperatures and under high pressures. Conventional operations of this type, however, have many disadvantages. Thus, in order to maintain catalyst activity at a desired level and to avoid heavy deposition of coke on the catalyst, it has been found necessary to employ excessively high hydrogen pressures of the order of at least about 3000 pounds per square inch and generally higher. Such pressures have necessitated the use of expensive high pressure equipment.

Hydrocracking processes of the prior art have involved contacting the hydrocarbon charge with a catalyst for such period of time until the catalyst becomes contaminated. Regeneration has not been feasible with many catalysts. In some cases the catalyst has been regenerated by burning in an oxygen-containing atmosphere. As will be realized, no useful hydrocarbon products are obtained during the period of regeneration. It is accordingly desirable to complete the catalyst regeneration as quickly as possible consistent with other factors such as the regeneration temperature employed and the oxygen content of the surrounding atmosphere.

It has heretofore been proposed to effect hydrocracking in the presence of a catalyst consisting essentially of an acidic cracking component such as cogelled composites of silica-alumina, silica-zirconia, silica-alumina-zirconia, silica-alumina-thoria and the like, which component has deposited thereon a minor proportion of a platinum metal. Such proposed catalysts have been found, in general to possess good activity and selectivity for use in hydroprocessing operations. However, upon regeneration to remove coke by burning the same in an oxygen-containing atmosphere, the siliceous platinum metal catalysts above described were found to have reduced activity and selectivity. The observed decline in these properties has commonly been attributed to agglomeration of the platinum metal.

Several proposals have heretofore been advanced to minimize the above problem including the separate maintenance of platinum on alumina in a physical mixture of catalyst components as well as the addition of a halide to an alumina support to impart the requisite acidity prior to impregnation with platinum metal. While such proposed processes possess various advantages, there still exists a need in commercial operation for an efficient platinum metal hydrocracking catalyst of high activity which is simultaneously characterized by good regenerability.

It is accordingly a principal object of the present invention to provide a platinum metal hydrocracking catalyst suitable for commercial operation having the desirable attributes of high activity, high selectivity and good regenerability when employed in the hydrocracking of selected petroleum fractions, thereby affording an overall improved and commercially attractive hydrocracking process.

The above and other objects which will be apparent to those skilled in the art are realized in accordance with this invention. In one embodiment, the present invention relates to a process for hydrocracking a hydrocarbon charge by contacting the same under hydrocracking conditions with a catalyst consisting essentially of a composite of 25 to 75 percent by weight silica, 0.05 to 10 percent by weight of a platinum metal and remainder a metal oxide, such as alumina, magnesia, zirconia, thoria, titania or combinations thereof, which upon interaction with silica gives rise to acidic cracking catalyst sites prepared by impregnating said metal oxide component with the platinum metal component, mechanically mixing the resulting impregnated product with the silica component under conditions of intimate contact such as to effect chemical interaction between the same and drying and treating the resulting composite at an elevated temperature. In another embodiment, the invention provides an effective hydrocracking catalyst of the above composition resulting from preparation in the specified manner.

In accordance with the present invention, it has been discovered that cracking of hydrocarbons in the presence of hydrogen and a particular catalyst followed by regeneration of such catalyst is not subjected to the disadvantages noted hereinabove. It has further been found that the catalyst employed herein, in addition to having the desired high activity and selectivity is characterized by unusual stability. Thus, it has been found that hydrocracking of hydrocarbons may be carried out with improved results in the presence of a catalyst consisting essentially of a metal of the platinum series, i.e. platinum, palladium, rhodium, osmium, iridium, and ruthenium deposited on a metal oxide which upon interaction with silica produces acidic cracking catalyst sites and stabilized by intimate admixture thereof with silica in the form of a gel, i.e. a hydrogel or gelatinous precipitate and present in an amount corresponding to at least about 25 weight percent on a dry basis, said admixture taking place under conditions of contact such that chemical interaction between the metal oxide and silica components is effected, followed by drying and treating the resulting composite at a temperature within the approximate range of 450 to 1400 and preferably 700 to 1200° F.

In general, the present invention affords a hydrocracking catalyst consisting essentially of a composite of at least about 25 percent by weight of silica, 0.05 to 10 percent by weight of a metal of the platinum series and alumina prepared by impregnating the alumina component with the platinum metal, mechanically mixing the resulting impregnated product with silica hydrogel under conditions such that chemical interaction between the components is achieved, such as by ball milling the mixture in finely divided form over an extended period of time and drying. The resulting product is treated at an elevated temperature suitably but not necessarily in a reducing atmosphere.

The present invention also provides a process for hydrocracking hydrocarbons and particularly petroleum hydrocarbon fractions having an initial boiling point of at least about 400° F., a 50 percent point of at least about 500° F. and an end boiling point of at least about 600° F. by contacting said fractions with the above catalyst in the presence of hydrogen at a pressure between about 100 and about 5000 pounds per square inch gauge, at a liquid hourly space velocity of between about 0.1 and about 10, at a temperature between about 400° F. and 950° F., employing a molar ratio of hydrogen to hydrocarbon charge between about 2 and about 80.

It has heretofore been proposed to convert hydrocarbon fractions to products of increased octane number by subjecting them to reforming operations. These operations employ hydrogen and catalysts which, in some cases, comprise a platinum metal component. The hydrocracking process described herein is distinct from the reforming processes of the prior art that involved use of a platinum metal-containing catalyst. Thus, there are at least four differences between the cracking process of this invention and the aforesaid reforming operations. First of all, it is to be noted that the processes are carried out for two different purposes. Cracking is used to convert high boiling hydrocarbon fractions into low boiling hydrocarbon fractions while reforming is carried out for the purpose of increasing the octane number of low boiling hydrocarbon fractions with little or no cracking. Secondly, the charge stocks employed in cracking and in reforming are not the same. A reforming charge stock, i.e. a naphtha, ordinarily has an initial boiling point well below about 400° F. and usually as low as 125° F. to 200° F. Regardless of the initial boiling point, however, the reforming charge stocks have 50 percent points well below 500° F. and end boiling points far below 600° F. Cracking charge stocks employed in the instant process, on the other hand, have initial boiling points of at least about 400° F., 50 percent points of at least about 500° F. and end boiling points of at least about 600° F. A third difference relates to the chemical reactions involved in the process. In reforming, it is desired to produce gasolines having substantially aromatic hydrocarbon contents from highly aliphatic reforming charge stocks. Accordingly, reforming involves aromatization reactions resulting in the production of large amounts of hydrogen during the reforming operation. Cracking, on the other hand, does not involve these aromatization reactions since the purpose of cracking is to convert high boiling hydrocarbons by selective breakage of carbon to carbon bonds. In contrast to reforming, such operation consumes hydrogen. A still further distinction resides in the fact that the cracking process of this invention is obtainable at temperatures that are lower than the temperatures at which reforming processes are obtainable. It will accordingly be appreciated that the aforementioned reforming processes of the prior art and the cracking process of this invention are clearly distinct.

The metal oxide component of the present catalyst is one which upon interaction with silica produces acidic cracking catalyst sites. Such metal oxides are well known in the art and include, by way of example, alumina, magnesia, zirconia, titania, thoria and combinations thereof. Preference is accorded alumina. Such alumina component may be eta alumina, gamma alumina or mixtures thereof and preferably consists of a mixture comprising a major proportion of eta alumina and a minor proportion of gamma alumina. Alumina and alumina hydrates, as is well known, may be present in various transitional forms or phases, either as a single phase or as a mixture of two or more phases. Thus, alpha alumina is a high temperature phase, occurring naturally in rocks, as the mineral corundum. Beta alumina monohydrate or diaspore also occurs abundantly in nature. Alpha alumina monohydrate may be prepared synthetically in various ways, for example by addition of ammonium hydroxide to an aluminum chloride solution. Alpha alumina trihydrate may be prepared by aging alpha alumina monohydrate in a cold basic solution. Beta alumina trihydrate is also formed by aging alpha alumina monohydrate in a cold basic solution but is unstable and gradually is transformed into alpha alumina trihydrate. Chi alumina is obtained upon calcination of alpha alumina trihydrate. Gamma alumina is obtained upon calcination of alpha alumina monohydrate. Eta alumina results from calcination of beta alumina trihydrate. The nomenclature above used with reference to alumina phase designation is that generally employed in the United States and described in "The Aluminum Industry: Aluminum and Its Production," by Edwards, Frary and Jeffries, published by McGraw-Hill (1930). The various above-designated phases of alumina, including occurrence in nature, preparation, phase transitions, crystal structure and physical properties are described in detail in "Alumina Properties," by A. S. Russell et al.; Aluminum Company of America, Pittsburgh, Pa. (1956).

Eta or a mixture of eta and gamma alumina is preferred as the alumina component of the present catalyst. Gamma alumina is known to result from calcination of alpha alumina monohydrate ($\alpha$-$Al_2O_3$·$H_2O$). Eta alumina, on the other hand, is obtained from calcination of beta alumina trihydrate ($\beta$-$Al_2O_3$·$3H_2O$). Accordingly, alumina in the hydrous state consists for the above-noted purposes, of beta alumina trihydrate or a mixture of alpha alumina monohydrate and beta alumina trihydrate. A particularly effective alumina base for deposition thereon of the platinum metal is one obtained from a hydrous alumina composite having an alpha alumina monohydrate content in the approximate range of 5 to 35 percent by weight and a content of alumina trihydrate, predominately in the form of beta alumina trihydrate, of 65 to 95 percent by weight of total alumina hydrate.

The alumina component of the present catalyst is thus a porous alumina, preferably of the above-designated phase composition which is not adversely affected by the temperature conditions encountered during hydrocracking. The alumina is further characterized by a surface area greater than 100 square meters per gram and which may extend up to 600 square meters per gram or more. Catalysts prepared from alumina having a surface area of 100 square meters per gram or less have a considerably poorer activity when employed in the present hydrocracking process in comparison to catalysts in which the alumina component initially is characterized by a surface area in substantial excess of 100 square meters per gram. The term "surface area" as used herein, designates the surface area as determined by the adsorption of nitrogen according to the method of Brunnauer et al., Journal American Chemical Society 60, 309 et seq. (1938). The density of the alumina employed, i.e. the bulk density thereof, will usually be within the range of 0.2 to 2.0 grams/cc. and more particularly, between about 0.4 and about 1.2 grams/cc.

The alumina component of the present catalyst may be prepared by commingling a suitable basic compound including ammonium hydroxide, ammonium carbonate, etc. with an acidic compound of aluminum including the chloride, bromide, iodide, fluoride, sulfate, phosphate, nitrate, acetate, etc. or by the addition of a suitable acidic compound including hydrogen chloride, sulfuric acid, phosphoric acid, etc. to an alkaline compound of the metal as for example, an alkali metal aluminate, such as sodium aluminate. The resultant aluminum hydroxide is usually washed to remove soluble impurities and then is dried at a temperature of from 200° F. to 600° F. for a period of from 1 to 24 hours or more. In one method, the dried alumina is formed into particles of definite size and shape in any suitable manner such as casting, pelleting, extruding, etc. and then is subjected to calcination at a temperature of from about 600° F. to about 1600° F. Alternatively, the alumina may be prepared in the form of a precipitate by controlled reaction of aluminum metal with water in the presence of a mercury compound whereby the aluminum undergoes amalgamation and the resulting amalgamated aluminum reacts with the water to form alumina.

The alumina prepared in accordance with the above methods may be substantially free of combined halogen or may contain combined halogen in an amount of about 0.2 to about 8 percent by weight of the total product. In obtaining the desired halogen content for a catalyst which is prepared from aluminum chloride, the gel is washed with water or ammoniated water until the halogen content of the wash water is zero or negligible. Thereafter, halogen is added in the desired proportion. Such technique leads to a more accurate control of the combined halogen in the ultimate catalyst product.

The alumina component has deposited thereon a catalytically effective amount of a platinum metal, i.e. platinum, palladium, osmium, iridium, rhodium, and ruthenium, as well as alloys or mixtures of these metals. Of the foregoing, platinum and palladium and, in particular, platinum are accorded preference. The amount of the platinum metal contained in the present catalyst is generally between about 0.05 and about 10 percent by weight of the finished catalyst and, more particularly, between about 0.1 and about 5 percent by weight of the finished catalyst.

The platinum metal may be deposited on the alumina component in any suitable manner. One feasible method is to admix particles of the alumina component with an aqueous solution of an acid of the metal, for example, chloroplatinic acid of suitable concentration. A preferred method of introducing platinum is to contact the alumina with a solution of chloroplatinic acid while stirring and to thereafter pass hydrogen sulfide gas through the slurry with continued stirring forming platinum sulfide. While platinum is preferably combined with the alumina as a solution of chloroplatinic acid, other suitable platinum solutions may be employed including solutions or suspensions of platinum cyanide, platinum sulfide, platinum hydroxide, or platinum oxide. In cases where the solution of platinum metal compound is not soluble in water, other suitable solvents such as alcohols, ethers, etc., may be used. In addition to platinum, other metals of the platinum family such as palladium may be combined with the alumina in a similar manner using for example, palladium chloride as the impregnating solution. The impregnated particles are then dried and treated with hydrogen at elevated temperatures to reduce the chloride to the metal and to activate the composite, or are calcined in air or other media at elevated temperatures. The resulting composite of platinum metal on alumina, preferably characterized by the phase designation indicated hereinabove, has a surface area generally within the range of about 350 to 550 square meters per gram.

The silica component of the present catalyst is initially prepared in the form of a gel, which term as utilized herein, refers to a hydrogel or gelatinous precipitate. Preferably, the silica component is prepared in the form of a hydrogel by reaction between sodium silicate and an acid, such as sulfuric acid, by treating the sodium silicate with carbon dioxide or by other well known means. The initially formed hydrosol of silica undergoes gelation after lapse of a suitable period of time to silica hydrogel. The time of gelation can be controlled within desired limits by well known means such as adjustment in the temperature or solids concentration of the reaction mixture or hydrosol produced therefrom. The resulting hydrogel is thereafter water-washed, base-exchanged to remove zeolitic sodium and dried. If it is desired to prepare silica initially free of alkali metal ions, such may be accomplished by effecting hydrolysis of alkyl silicates, i.e. ethyl silicate. The silica hydrogel may be produced in the form of granules or in the form of a mass, which is thereafter broken up into pieces or particles of desired size. Alternatively, the silica hydrogel may be produced in the form of spheroidal bead particles by methods such as those described by Marisic in U.S. 2,384,946, or in the form of uniformly shaped particles prepared by casting or extrusion methods. It is also feasible to initially produce silica in the form of finely divided particles of requisite particle size by employing techniques used in the preparation of fluid catalyst particles, for example, by spraying or rapid agitation of a hydrosol to form minute particles of hydrosol that set to particles of hydrogel, which, upon drying yield discrete particles of silica gel. Generally, it is preferred that the silica component before admixture with the alumina-containing component be in a finely divided state, generally of a particle size finer than 50 mesh (Tyler) and preferably of a particle size within the approximate range of 60 to 200 mesh (Tyler). The above indicated finely divided state of silica can be obtained either during initial formation of the silica or by grinding larger size pieces to the requisite particle size.

The silica-containing component, preferably in finely divided form, is intimately mixed with the alumina-containing component impregnated with platinum metal which likewise is in a finely divided state preferably having a particle size within the approximate range of 60 to 200 mesh (Tyler). It is essential that the silica component be present in an amount corresponding to at least about 25 weight percent of the finished catalyst. Composites containing amounts of silica less than about 25 percent by weight do not possess the desired hydrocracking activity observed in the case of the present catlayst. The amount of silica admixed with the platinum metal-impregnated alumina component accordingly is such as to afford a resulting catalyst containing, on a dry basis, a silica content in the approximate range of 25 to 75 percent weight.

Admixture of the platinum metal on alumina and silica components of the present catalyst is carried out under conditions of intimate contact such as to effect chemical interaction between such components. As is well known, platinum-alumina alone is a very poor hydrocracking catalyst because of its low activity. Silica gel also is a very poor hydrocracking catalyst. Consequently, these two compoents cannot be merely a physical mixture, but must be intimately combined under specific conditions such that a chemical interaction between the silica and alumina components is accomplished. A most convenient manner of effecting the desired interaction is by co-ballmilling the platinum metal-alumina and silica gel components for a sufficient period of time and conditions affording a high degree of intimate admixture. Other well known means may be employed. In general, it is preferred to combine components for a sufficiently long time that particle size is reduced to about 100 microns and preferably to about 5 microns.

After thorough mixing of the components, the resulting chemical composite is formed by pelleting, casting, molding or other means into pieces of desired size and shape such as rods, spheres, pellets, etc. After forming into particles of desired size, the resulting particles are dried and thereafter calcined at an elevated temperature. Calcination is preferably effected in a reducing atmosphere, such as hydrogen at a temperature in the approximate range of 400 to 1400° F.

Hydrocracking, in accordance with the present process, is generally carried out at a temperature between about 400° F. and about 950° F. The hydrogen pressure in such operation is generally within the range of about 100 to about 5000 pounds per square inch gauge and preferably about 350 and about 2000 pounds per square inch gauge. The liquid hourly space velocity, i.e. the liquid volume of hydrocarbon per hour per volume of catalyst is between about 0.1 and about 10. In general, the molar ratio of hydrogen to hydrocarbon charge employed is between about 2 and about 80 and preferably between about 5 and about 50.

Hydrocarbon charge stocks undergoing cracking in accordance with this invention comprise hydrocarbons, mixtures of hydrocarbons, and particularly, hydrocarbon fractions having an initial boiling point of at least about 400° F., a 50 percent point of at least about 500° F. and an end point of at least about 600° F. Such hydrocarbon fractions include gas oils, residual oils, cycle stocks, whole topped crudes, and heavy hydrocarbon fractions derived by the destructive hydrogenation of coal, tars, pitches, asphalts and the like. As will be recognized, the distillation of higher boiling petroleum fractions must be carried out under vacuum in order to avoid thermal cracking. The boiling temperatures utilized herein, however, are expressed for convenience in terms of the boiling point corrected to atmospheric pressure.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst, wherein the hydrocarbon flow may be concurrent or countercurrent to the catalyst flow. A fluid type of operation may also be employed with the catalyst described herein.

The catalyst after use in hydrocracking for a period of time such that its activity is detrimentally affected is sujected to regeneration. For such purpose, the spent catalyst is contacted with an oxygen-containing atmosphere at an elevated temperature sufficient to burn carbonaceous deposits from the catalysts. Regeneration conditions for the hydrocracking catalyst described herein include a temperature between about 600 and about 1000° F., a pressure from atmospheric to 2000 pounds per square inch, and an oxygen concentration of 0.1 percent to 100 percent. Oxygen may be diluted with nitrogen or other inert gas. Careful control of the rate of burning and temperature during regeneration is necessary in order not to impair the catalytic activity of the platinum metal component. Higher temperatures during regeneration, i.e. exceeding about 1000° F. are generally undesirable since such are believed to harm platinum metal catalysts.

The following examples will serve to illustrate the process of the invention without limiting the same:

EXAMPLE 1

A composite of platinum on alumina containing 0.58 percent by weight platinum, 0.73 percent by weight chlorine and having a surface area of 454 m.$^2$/gram was intimately mixed by ball milling, without added water, with silica hydrogel having a solids content of 33 percent by weight. The platinum-alumina component comprised, on a dry basis, 85 percent by weight of the mixture and resulted from impregnation of the alumina utilizing chloroplatinic acid with subsequent drying and calcining. The silica component constituted, on a dry basis, 15 percent by weight of the mixture.

Ball milling was carried out for 16 hours. At the end of this period the resulting mass was ground to a small size and 2 percent by weight stearic acid was added. The mixture was then pelleted, crushed and screened to a particle size of 14–25 mesh. The resulting material was then treated with hydrogen for 2 hours at 450° F. and thereafter for 2 hours at 950° F. The product so prepared was characterized by a surface area of 301 m.$^2$/gram, a bulk density of 0.82 g./cc. and had a platinum content of 0.52 percent by weight.

EXAMPLE 2

A platinum-silica-alumina composite was prepared by the method of Example 1 except that the amount of silica hydrogel component was increased to provide a finished catalyst having a silica content of 50 percent by weight. The platinum-alumina component employed contained 0.59 percent by weight platinum, 0.71 percent by weight chlorine and had a surface area of 425 m.$^2$/gram. The catalyst product contained 0.30 percent by weight platinum, 0.31 percent by weight chlorine and had a surface area of 418 m.$^2$/gram and a bulk density of 0.53 gram/cc.

EXAMPLE 3

A commercially available composite of platinum on alumina containing 0.6 weight percent platinum, 0.6 weight percent chlorine and having a surface area of 370 m.$^2$/gram was, for purposes of comparison, used as the catalyst of this example.

The above catalysts were tested for hydrocracking activity utilizing a heavy gas oil as the charge stock. Such charge comprised material boiling continuously between about 650° F. and a residual fraction of 10.6 volume percent of crude and was further characterized by the following properties.

| | |
|---|---|
| Gravity | 26.8 |
| Vacuum assay, ° F.: | |
| 5% | 682 |
| 50% | 781 |
| 95% | 885 |
| Sulfur, wt. percent | 0.79 |
| Nitrogen, wt. percent | 0.08 |
| Aniline No., ° F. | 184.5 |

The reaction conditions employed included a pressure of 1500 p.s.i.g., a liquid hourly space velocity of 0.5, hydrogen in the amount of 14,500 standard cubic feet per barrel and temperatures designated in Table I hereinbelow. The products obtained with each of the foregoing catalysts are shown below in such table on a no-loss basis, i.e. distributing all loss or gain proportionally by weight over all products.

Table I

| Catalyst Example | 2 | 1 | 3 |
|---|---|---|---|
| Temp., °F | 798 | 825 | 917 |
| Conversion, 390° F.[a] | 59.6 | 58.8 | 56.6 |
| Conversion, 650° F.[b] | 100.0 | 99.5 | 95.7 |
| Dry Gas, Wt. percent[c] | 2.5 | 4.7 | 10.4 |
| Butanes, Vol. percent | 9.0 | 8.8 | 12.3 |
| Light Naphtha,[d] Vol. percent | 16.9 | 13.3 | 16.1 |
| Hvy. Naphtha,[e] Vol. percent | 52.0 | 51.1 | 35.2 |
| Lt. Fuel Oil,[f] Vol. percent | 40.4 | 40.7 | 39.1 |
| 650° F.+ Product, Vol. percent | | | 4.3 |
| $C_5^+$ Product, Vol. percent | 109.3 | 105.6 | 94.7 |
| Hydrogen Consump., s.c.f./b | 1,330 | 1,450 | |

[a] 100 minus vol. percent of product based on charge boiling above 390° F.
[b] 100 minus vol. percent of product based on charge boiling above 650° F.
[c] Hydrocarbons of 1 through 3 carbon atoms only; does not include hydrogen sulfide or ammonia.
[d] Pentanes and higher boiling products.
[e] Product boiling from 170–390° F.
[f] Product boiling from 390° F. to 650° F. (based on ASTM distillation).

It will be seen from the foregoing data that platinum-alumina (catalyst of Example 3) was a very poor hydrocracking catalyst having a low activity and affording poor yields of liquid products. Silica gel likewise is not an effective hydrocracking catalyst. The chemical combination resulting from intimate admixture of platinum-alumina and silica gel, however, proved to be an effective catalytic composite characterized by exceptionally good hydrocracking selectivity and activity. The catalyst with the higher silica content was unexpectedly more active and selective. The effect of silica content is shown in the attached figure wherein the temperature required to obtain substantially the same percent conversion is plotted against the percentage of silica in the catalyst employed. It will be seen by reference to such figure that the silica content of the catalytic composite prepared by the method described herein should be between about 25 and about 75 weight percent.

As noted hereinabove, it is desirable to obtain a catalyst wherein change in platinum activity is small on regeneration. The test used herein to measure such change is the Dehydrogenation Activity (DA) test. This test affords determination of the extent of dehydrogenation of cyclohexane under fixed conditions. In evaluating dehydrogenation activity, a small amount of catalyst sample for example, 15 milligrams, deposited on a "boat" as 100–200 mesh powder is introduced into a glass reactor tube. Cyclohexane and hydrogen at atmospheric pressure are passed over the catalyst at a rate of 55.2 cc. liquid cyclohexane per hour and hydrogen in a molar ratio of 4:1 of hydrogen to hydrocarbon. The catalyst temperature is maintained at 800° F. The product liquid is analyzed for benzene by a mass spectrometer and from its concentration, the rate of formation of benzene in units of $10^6$ moles/second per gram catalyst sample is calculated. The number is designated as the dehydrogenation activity or DA index. The higher the number, the more active the catalyst. After regeneration of platinum catalysts, there is generally a decline in dehydrogenation activity.

The catalysts evaluated are shown in Table II. Such catalysts include a silica promoted platinum-alumina composite prepared as described above in Example 2, a platinum-alumina composite similar to that of Example 3, and a platinum-silica-alumina catalyst prepared by impregnation of a silica-alumina cogel with platinum and containing about 90 percent by weight silica, and about 10 percent by weight alumina to which is added 0.52 percent by weight platinum.

The catalyst samples were placed in stainless steel open mesh baskets and the latter were inserted in a stainless steel reactor. After purging with nitrogen, the catalyst was heated in an atmosphere of hydrogen to 900° F. The catalyst was then subjected to five cycles at 900° F. as follows:

| | Hrs. |
|---|---|
| Hydrogen (100 ml./min.) | 3 |
| Nitrogen | 0.5 |
| Air (12 ml./min.) | 20 |
| Nitrogen | 0.5 |

At the end of the cycles, the catalyst was treated with hydrogen for two hours. It was then purged with nitrogen and cooled to room temperature.

Upon testing, it was found that the dehydrogenation activity of the platinum-alumina catalyst declined only moderately. The dehydrogenation activity of the platinum-silica-alumina catalyst declined quite markedly. The dehydrogenation activity of the silica-promoted catalyst (catalyst of Example 2) increased establishing the exceptionally good regeneration characteristics of this catalyst. The results obtained are set forth in Table II below:

Table II

| Catalyst Description | $Pt/Al_2O_3$ $+SiO_2$ (Catalyst of Example 2) | $Pt/Al_2O_3$ | $Pt/SiO_2/Al_2O_3$ |
|---|---|---|---|
| Dehydrogenation Activity—Fresh | 105 | 1,000 | 365 |
| Dehydrogenation Activity—After 5 Cycle Test | 130 | 800 | 25 |

It will be understood that the above description is merely illustrative of preferred embodiments of the invention of which many variations may be made within the scope of the following claims by those skilled in the art without departing from the spirit thereof.

We claim:

1. A process for cracking a hydrocarbon charge which comprises contacting the same in the presence of hydrogen with a catalyst consisting essentially of 25 to 75 percent by weight silica, 0.05 to 10 percent by weight of a metal selected from the group consisting of platinum and palladium and remainder alumina, prepared by impregnation of the alumina component with said metal, mechanical admixture of the resulting impregnated product with the silica component in the form of a hydrogel, under conditions of intimate contact to effect chemical interaction between said silica and alumina components and thereafter drying and treating the resulting composite in a reducing atmosphere at a temperature in the approximate range of 450° to 1400° F.

2. A process for cracking a hydrocarbon charge which comprises contacting the same in the presence of hydrogen with a catalyst consisting essentially of 25 to 75 percent by weight silica, 0.05 to 10 percent by weight of platinum and remainder an alumina selected from the group consisting of eta alumina, gamma alumina and mixtures thereof, prepared by impregnation of the alumina component with platinum, mechanical admixture of the resulting impregnated product with the silica component in the form of a hydrogel under conditions of intimate contact to effect chemical interaction between said silica and alumina components and thereafter drying and treating the resulting composite in an atmosphere of hydrogen at a temperature in the approximate range of 700° F. to 1200° F.

3. A process for cracking a hydrocarbon charge which comprises contacting the same in the presence of hydrogen with a catalyst consisting essentially of 25 to 75 percent by weight silica, 0.05 to 10 percent by weight platinum and remainder alumina prepared by impregnating the platinum on the alumina component, which component consists essentially of 65 to 95 percent by weight of eta alumina and 3 to 35 percent by weight of gamma alumina, ball milling the resulting impregnated product with silica hydrogen for such period of time to effect chemical interaction between said alumina and silica components and thereafter drying and treating the resulting composite at a temperature in the approximate range of 450 to 1400° F.

4. A hydrocracking catalyst consisting essentially of 25 to 75 percent by weight silica, 0.05 to 10 percent by weight of a metal selected from the group consisting of platinum and palladium and remainder alumina, prepared by impregnation of the alumina component with said metal, mechanical admixture of the resulting impregnated product with the silica component in the form of a hydrogen, under conditions of intimate contact to effect chemical interaction between said silica and alumina and thereafter drying and treating the resulting composite in a reducing atmosphere at a temperature in the approximate range of 450 to 1400° F.

5. A hydrocracking catalyst consisting essentially of 25 to 75 percent by weight silica, 0.05 to 10 percent by weight platinum and remainder alumina prepared by impregnating the platinum on the alumina component, which component consists essentially of 65 to 95 percent by weight of eta alumina and 3 to 35 percent by weight of gamma alumina, the resulting product of impregnation being characterized by a surface area of between about 350 and about 550 square meters per gram, ball milling the resulting impregnated product with silica hydrogel for such period of time to effect chemical interaction between said alumina and silica components and thereafter drying and treating the resulting composite at a temperature in the approximate range of 450 to 1400° F.

References Cited in the file of this patent
UNITED STATES PATENTS

| | | |
|---|---|---|
| 2,834,719 | Mosley et al. | May 13, 1958 |
| 2,854,401 | Weisz | Sept. 30, 1958 |
| 2,945,806 | Ciapetta | July 19, 1960 |
| 3,000,811 | Murray et al. | Sept. 9, 1961 |